(maximum temperature 90° C.). The yield of diol was 63.8 g. (95.6%).

A great variety of dihydroxy diaryl compounds may be used in producing the polymers of the present invention. Dihydroxy-diarylalkanes of this class may be represented by the general formula:

HO—(Ar)—R*—(Ar)—OH where Ar is an aryl group and R* is a divalent aliphatic hydrocarbon group. Representative of R* are methylene, ethylene, propylene, butylene, pentylene, hexylene, heptylene, octylene, nonylene and substituted groups such as phenylmethylene and the like. Representative of the dihydroxy-diarylalkanes of this general formula are:

4,4'-dihydroxy-diphenylmethane,
4,4'-dihydroxy-diphenyl-1,1-ethane,
4,4'-dihydroxy-diphenyl-1,1-propane,
4,4'-dihydroxy-diphenyl-1,1-butane,
4,4'-dihydroxy-dephenyl-1,1-(2-methylpropane),
4,4'-dihydroxy-diphenyl-1,1-heptane,
4,4'-dihydroxy-diphenyl-1,1-(2-methylbutane),
4,4'-dihydroxy-diphenyl-1,1-(1-phenylmethane),
4,4'-dihydroxy-diphenyl-2,2-propane,
4,4'-dihydroxy-diphenyl-2,2-butane,
4,4'-dihydroxy-diphenyl-2,2-pentane,
4,4'-dihydroxy-diphenyl-2,2-(4-methylpentane),
4,4'-dihydroxy-diphenyl-2,2-heptane,
4,4'-dihydroxy-diphenyl-2,2-octane,
4,4'-dihydroxy-diphenyl-2,2-nonane,
4,4'-dihydroxy-diphenyl-3,3-pentane,
4,4'-dihydroxy-diphenyl-4,4-heptane,
4,4'-dihydroxy-diphenyl-1,1-cyclohexane,
4,4'-dihydroxy-3,3'-dicyclohexyl-diphenyl-2,2-propane,
4,4'-dihydroxy-3-methyl-diphenyl-2,2-propane,
4,4'-dihydroxy-3-isopropyl-diphenyl-2,2-butane,
4,4'-dihydroxy-3,3'-dibutyl-diphenyl-2,2-propane,
4,4'-dihydroxy-2,2'-dimethyl-diphenyl-2,2-propane,
4,4'-dihydroxy-3,3'-dimethyl-6,6'-dibutyl-diphenyl-1,1-butane,
4,4'-dihydroxy-3,3'-dimethyl-6,6'-di-tert.butyl-diphenyl-1,1-propane,
4,4'-dihydroxy-3,3'-dimethyl-6,6'-di-tert.butyl-diphenyl-1,1-(1-phenyl-methane),
4,4'-dihydroxy-3,3'-dimethyl-6,6'-di-tert.butyl-diphenyl-1,1-(2-methyl-pentane),
4,4'-dihydroxy-diphenyl-4-methyl-phenylmethane, and
4,4'-dihydroxy-diphenyl-4-isopropyl-phenylmethane.

Among the suitable dihydroxy-diarylalkanes suggested in the above non-exhaustive list, the preferred compositions are from a group comprised of structures where Ar is a benzene radical, R* is an alkylene radical of one to five carbon atoms, and the hydroxy groups are in para positions such as 4,4'-dihydroxy-diphenyl-2,2-propane.

In addition to the dihydroxy-diarylalkanes suggested above, dihydroxy-diarylsulfones and dihydroxy-diarylethers may also be used. In such instances R* of the generalized formula above would be

and —O— respectively. Representative of compounds of these classes are:

4,4'-dihydroxy-diphenylsulfone,
3,3'-dihydroxy-diphenylsulfone,
4,4'-dihydroxy-2,2'-dimethyl-diphenylsulfone,
2,2'-dihydroxy-4,4'-dimethyl-diphenylsulfone,
4,4'-dihydroxy-3,3'-diethyl-diphenylsulfone,
4,4'-dihydroxy-3,3'-di-tert.butyl-diphenylsulfone,
4,4'-dihydroxy-diphenylether,
4,4'-dihydroxy-2,2'-dimethyl-diphenylether,
2,2'-dihydroxy-4,4'-dimethyl-diphenylether, and
4,4'-dihydroxy-3,3'-diethyl-diphenylether.

The polymers of the present invention are prepared by condensing phosgene with the bis-hydroxy(-alkyl and -aryl) pyromellitic diimides alone or in combination with the described diols derived from dimeric fat acids and/or the dihydroxy-diaryl compounds. Such phosgenation can be carried out using conventional techniques. See Schnell, Chemistry and Physics of Polycarbonates, ch. III (1964), for a general discussion of the preparation of polycarbonates by phosgenation.

Phosgenation proceeds when phosgene is introduced to a solution of the reactant or reactants in organic bases such as trimethylamine, pyridine, and diethylaniline, or in inert (with respect to the compositions present in this class of reactions) organic solvents such as methylene chloride, chloroform, chlorobenzene, dichloroethylene and tetrachloroethane, with addition of an acid-binding agent such as a tertiary amine. Preferred phosgenation reactions employ the solution in pyridine, or in methylene chloride with the addition of a small amount of pyridine.

The new polyimide-polycarbonates of the present invention may be represented by the following general structural formula:

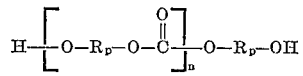

where $R_p$ is —(Ar)—R*—(Ar)—, —CH$_2$—D—CH$_2$— or

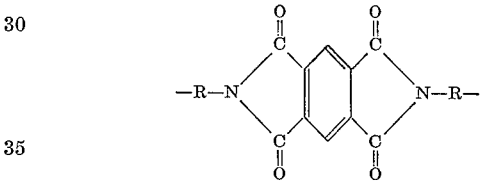

such latter group making up at least about 10% of the total number of $R_p$ groups in the polycarbonate polymer. In this general structural formula, n is best described as an integer such that the inherent viscosity of a solution of the polyimide-polycarbonate in an organic solvent (.5 g./100 ml. solution) at 30° C. is at least about 0.1. Inherent viscosity is a property which reflects the size of the average molecule of the polymer. In the case of essentially linear polymers, such as those of this invention, the size of the average molecule is directly proportional to the average molecular weight of the polymer. Also, in the polymers of the invention, it is preferred to use the diols derived from dimeric fat acids as the co-reactant when the same is present and a preferred ratio of diimide units to such diol units is 75:25::25:75.

The following examples are intended to illustrate more fully the nature of the invention, but are not to be construed as a limitation upon the scope thereof.

EXAMPLE I

Phosgene was bubbled into a solution of N,N'-bis(5-hydroxy-4,4-dimethylpentyl)-pyromellitic diimide prepared as in Example C (66.3 g., 0.3 eq.) in pyridine (500 ml.) at temperatures ranging from 40–52° C. The rate of addition was 0.8 g./min. for 10 minutes and 0.4–0.5 g./min. for 25 minutes, for a total addition of 18.5 g. (0.37 eq.). Pyridine hydrochloride had begun to precipitate after 12–14 minutes of addition. The mixture was triturated with 4–5 times its volume of isopropyl alcohol in a Waring blender, washed 4 times with the same reagent, partially air dried and evacuated to a constant weight in a vacuum oven. There was obtained 67 g. (95% yield) of polyimide-polycarbonate having a melting range of 210–230° C. and an inherent viscosity (0.5 g./100 ml. o-chlorophenol solution) of 0.49.

EXAMPLE II

Example I was essentially repeated using the diimide of Example B. The resulting homopolycarbonate had a melting range of 285–295° C. and an inherent viscosity in o-chlorophenol of 0.21.

EXAMPLE III

Example I was essentially repeated using the diimide of Example D. The resulting homopolycarbonate had a melting range of 225–235° C. and an inherent viscosity in o-chlorophenol of 0.31.

EXAMPLE IV

Example I was essentially repeated using the diimide of Example A. The resulting homopolycarbonate had a melting range greater than 295° C. and an inherent viscosity in hexafluoroisopropanol of 0.11.

EXAMPLE V

Phosgene was bubbled into a solution of the dimide of Example C (44.2 g., 0.2 eq.) and the diol of Example F (13.26 g., .049 eq.) in pyridine (500 ml.) at a rate of 1 g./min. for 10 minutes and 0.3 g./min. for 25 minutes (temperature range of 46–53° C. during phosgene addition). Pyridine hydrochloride had begun to precipitate after 10 minutes. At 35 minutes, a decided darkening occurred in the reaction mixture at which time the product mixture was poured into 2750 ml. of methanol rapidly stirring in a beaker. The precipitated product was isolated by filtration, washed once on the filter with methanol and triturated three times with methanol in a Waring blender. The product was partially air dried and evacuated to a constant weight in a vacuum oven. There was obtained 55.3 g. (91% yield) of copolycarbonate having a melting range of 170–190° C. and an inherent viscosity in o-chlorophenol of 0.39.

EXAMPLE VI

Example V was essentially repeated using the diimide of Example D and the diol of Example F in a weight ratio of 50:50. There was obtained a copolycarbonate having a melting range of 175–205° C. and an inherent viscosity in o-chlorophenol of 0.31.

EXAMPLE VII

Example V was essentially repeated using the diimide of Example B and the diol of Example F in a weight ratio of 30:70. There was obtained a copolycarbonate having a melting range of 175–235° C. and an inherent viscosity in o-chlorophenol of 0.165.

EXAMPLE VIII

Example VII was essentially repeated using a diimide-diol ratio of 70:30 by weight. The resulting copolycarbonate had a melting range of 260–285° C. and an inherent viscosity in o-chlorophenol of 0.133.

The polymers of the invention can be cast into films or drawn into fibers from common polar solvents onto substrates such as glass, steel, and copper wire to give protection thereto. The polymers can also be compression molded, giving films which can be cut while warm using a warm die. The utility of the polymers of the invention is further shown by the following examples.

EXAMPLE IX

A portion of the polyimide-polycarbonate of Example I was compression molded at 220° C. and 10,000 p.s.i. to give a 40 mil film. The film had an ultimate tensile strength of 730 p.s.i. (ASTM D1708–59T), an elongation of 10% (ASTM D1708–59T) and a 2% tensile modulus of elasticity of 197,000 (ASTM D1638–61T using die C in ASTM D412–62T). A 1 mil film cast onto glass from a 20% by weight solution of a portion of the polyimide-polycarbonate in methylene chloride gave a Sward Rocker hardness of 50 and a pencil hardness of 3B. A 0.65 mil film cast from such solution onto 10 mil stock cold-rolled steel gave a General Electric impact flexibility of 1–2% ("G.E. Impact Flexibility Tester," 55 Gardner Newsletter, vol. 3, No. 14).

EXAMPLE X

A .45 mil film cast onto glass from a 10% by weight solution of a portion of the polyimide-polycarbonate of Example IV gave a pencil hardness of 3B and a General Electric impact flexibility of 5–10%. A ½" x 1½" x 50 mil sample of partially fused powdered polyimide-polycarbonate, when ignited in a Bunsen flame, was immediately extinguished upon removal from the flame.

It is to be understood that the invention is not to be limited to the above examples which are illustrative only. Obvious modifications and equivalents to the described compositions and methods of operation will be apparent to those skilled in the art.

The embodiments of the invention in which an exclusive property or privilege is claimed are defined as follows:

1. A polyimide-polycarbonate polymer having the structural formula

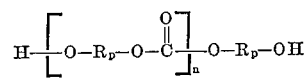

where $n$ is an integer representing the average number of recurring structural units in the polymer chain, such integer being of a magnitude such that the inherent viscosity of a solution of the polymer in an organic solvent (0.5 g./100 ml. solution) at 30° C. is at least about 0.1, $R_p$ is

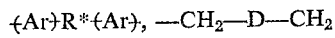

or

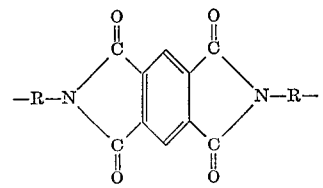

such latter group making up at least about 10% of the total number of $R_p$ groups in the polymer, Ar is an aryl radical, R* is a divalent aliphatic hydrocarbon radical, an oxygen atom or a sulfur dioxide radical, D is the divalent radical of a dimerized fat acid and contains 30 to 42 carbon atoms and R is a divalent radical of 2 to about 10 carbon atoms selected from alkyl, aryl and aralykyl radicals.

2. The polymer of claim 1 wherein 100% of the $R_p$ radicals are

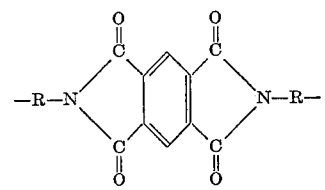

groups.

3. The polymer of claim 2 wherein R is an alkyl radical.

4. The polymer of claim 3 wherein R is —CH$_2$CH$_2$—.

5. The polymer of claim 3 wherein R is

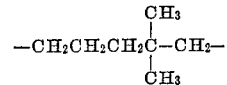

United States Patent Office 3,536,670
Patented Oct. 27, 1970

3,536,670
POLYCARBONATES FROM BIS-HYDROXY(-ALKYL AND -ARYL)PYROMELLITIC DIIMIDES
David Aelony and Arthur J. Coury, Minneapolis, Minn., assignors to General Mills, Inc., a corporation of Delaware
No Drawing. Filed May 26, 1969, Ser. No. 827,890
Int. Cl. C08g 17/13
U.S. Cl. 260—77.5                                                8 Claims

ABSTRACT OF THE DISCLOSURE

Polyimide-polycarbonates and co-(polyimide-polycarbonates) from bis-hydroxy(-alkyl and -aryl)pyromellitic diimides alone or in combination with diols derived from dimerized fat acids and/or dihydroxy-diaryl compounds.

The present invention relates to polycarbonates prepared from bis-hydroxy(-alkyl and -aryl)pyromellitic diimides. It further relates to such polycarbonates wherein a portion of the bis-hydroxy(-alkyl and -aryl)pyromellitic diimides are replaced by diols derived from dimerized fat acids and/or dihydroxy-diaryl compounds.

The new polycarbonates of the present invention are prepared by reacting bis-hydroxy(-alkyl and -aryl)pyromellitic diimides alone or in combination with diols derived from dimerized fat acids and/or dihydroxy-diaryl compounds with phosgene. Our new polymers have relatively high melting points and are useful for preparing moldings, solution cast films and the like.

The starting bis-hydroxy(-alkkyl and -aryl)pyromellitic diimides have the general structural formula

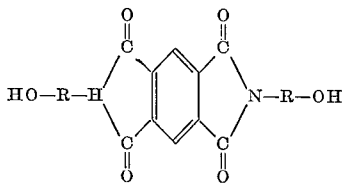

where R is a divalent radical of 2 to about 10 carbon atoms and may be alkyl (including cycloalkkyl), aryl and aralkyl. R is preferably a divalent alkyl group such as ethylene, propylene, hexamethylene, octamethylene, 2,2-dimethylpentamethylene and the like. The radical R may also contain atoms other than carbon and hydrogen such as oxygen—i.e. ether groups as represented by —$C_2H_4$—O—$C_2H_4$—. The radical may also be substituted with inert substituents such as nitro, chloro, fluoro, and the like.

The said diimides are conveniently prepared by reacting mono amino and mono hydroxy substituted compounds—i.e. amino alcohols—with pyromellitic half esters such as pyromellitic methyl half ester. Such reaction is carried out by heating the two reactants in an organic solvent. The reaction can be illustrated by the following equation:

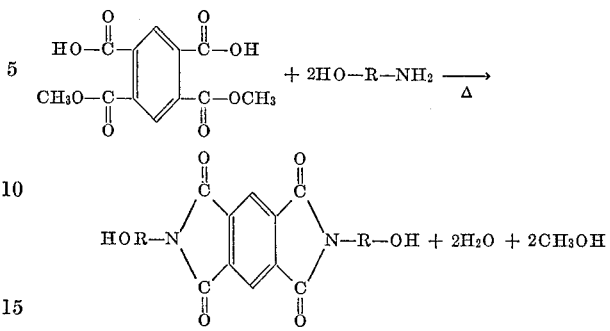

The preparation of various of the useful starting bis-hydroxy(-alkyl and -aryl)pyromellitic diimides can be illustrated by the following examples.

EXAMPLE A

One hundred forty one grams (½ mole) pyromellitic methyl half ester were dissolved in 1400 ml. methanol and then 61 ml. monoethanol amine was added. The reaction mixture was refluxed while being agitated for 24 hours. The resulting solution was neutral. It was evaporated on the rotary evaporator at 100° C., then in a vacuum oven one hour at 120° C. and four hours at 150° C. The product was a pinkish amorphous solid insoluble in boiling acetone, methanol, tetrahydrofuran, $CHCl_3$, $CH_3CN$ and $H_2O$. The crude material was dissolved in 350 ml. N-methyl pyrrolidone at 125° C. It was allowed to cool slowly and began to crystallize at 100° C. Because it gelled, it was diluted with acetone to 700 ml., cooled to 5° C. and filtered. The product weighed 142.5 g. and had a melting point of 281.5° C., a nitrogen content of 9.20% (theoretical 9.21%) and an acid number of 370 (theoretical 369.1). The diimide had the formula:

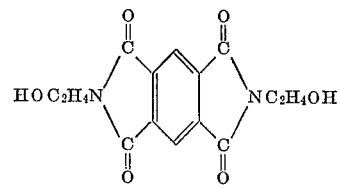

EXAMPLE B

Example A was essentially repeated using 3-amino-1-propanol instead of monoethanol amine. The resulting diimide had a melting point of 242–3° C., a nitrogen content of 8.32%, an acid value of 356.3 and the formula:

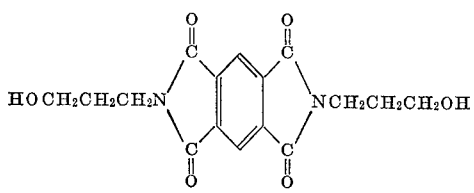

EXAMPLE C

Example A was essentially repeated using 5-amino-2,2-dimethyl-1-pentanol instead of monoethanol amine. The resulting diimide had a melting point of 228° C., a nitrogen content of 5.86%, an acid number of 278.1 and the formula:

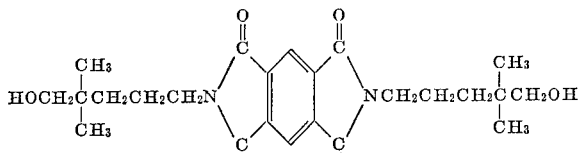

EXAMPLE D

Example A was essentially repeated using 6-amino-1-hexanol in place of monoethanol amine. The resulting diimide had the formula:

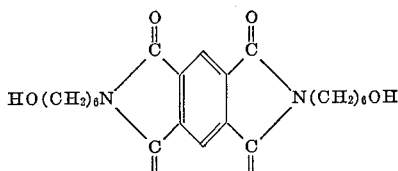

EXAMPLE E

Example A was essentially repeated using β-hydroxyethyl-β-aminoethyl ether in place of monoethanol amine. The resulting diimide had a melting point of 195° C., a nitrogen content of 7.05%, an acid number of 303.5 and the formula:

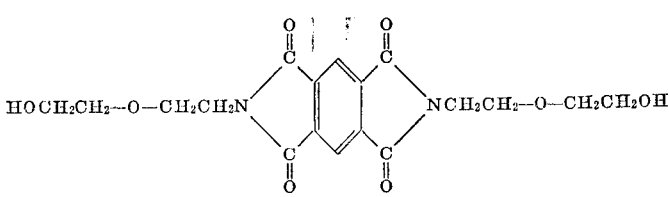

As indicated above, the bis-hydroxy(-alkyl and -aryl) pyromellitic diimides can be used alone to yield homopolycarbonates thereof or they can be used in combination with diols derived from dimerized fat acids containing 32 to 44 carbon atoms and/or dihydroxy-diaryl compounds. The former diols can be represented by the general formula:

where D is the divalent hydrocarbon radical of the dimerized fat acids exclusive of the carboxyl groups. D accordingly contains 30 to 42 carbon atoms.

The dimerized fat acids are prepared by polymerizing ethylenically unsaturated monobasic carboxylic acids having 16 to 22 carbon atoms or the lower alkyl esters thereof. The preferred acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic) 10,12,14-octadecatrienoic (pseudoeleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the dimerization of the unsaturated acids. Lower temperatures are generally used when a catalyst is employed.

As a practical matter, the dimeric fat acids are preferably prepared by the polymerization of mixtures of acids (or the simple aliphatic alcohol esters—i.e. the methyl esters) derived from the naturally occurring drying and semi-drying oils or similar materials. Suitable drying or semi-drying oils include soybean, linseed, tung, perilla, oiticia, cottonseed, corn, sunflower, dehydrated castor oil and the like. Also, the most readily available acid is linoleic or mixtures of the same with oleic, linolenic and the like. Thus it is preferred to use as the starting materials, mixtures which are rich in linoleic acid. An especially preferred material is the mixture of acids obtained from tall oil which mixture is composed of approximately 40–45% linoleic and 50–55% oleic. It is also preferred to carry out the polymerization in the presence of a clay.

The dimeric fat acids or the lower alkyl esters (i.e., 1–8 carbon atoms) may be reduced by any of the conventional methods to the corresponding diols used in this invention. For examples of such conventional methods see U.S. Pats. 2,347,000 and 2,413,612. In addition the diols may be prepared by the diisobutylaluminum hydride reduction of esters of the dimeric fat acids or by the lithium aluminum hydride reduction of such esters. One preferred laboratory method of preparing the diols is by the diisobutylaluminum hydride reduction of lower alkyl esters of the dimeric fat acids. The following example is illustrative of this method.

EXAMPLE F

A solution of 73.6 g. (0.518 mole) diisobutylaluminum hydride in 400 ml. heptane was added by means of a volumetric flask to a nitrogen-blanketed 2-l., 3-necked flask equipped with mechanical stirring, pressure-equalized dropping funnel containing a nitrogen inlet and a y-tube holding a dip-in- thermometer and condenser. Precautions were taken to exclude air from the system which would decompose the diisobutylaluminum hydride. The methyl ester of the dimeric fat acid (70.7 g., 0.238 eq.) in distilled hexane (250 ml.) was added over 20 minutes during which time the temperature rose to 68° C. Then the stirring rate was increased and the mixture was stirred for one hour. During this time the temperature dropped to 23° C. Then 300 ml. methanol was added slowly, because of the vigorous reaction. A thick gel formed, but the addition and stirring were continued, and the mixture became more fluid. Then 1000 g. of 10% by weight aqueous sulfuric acid was added with vigorous stirring, and the mixture formed two liquid layers. The organic layer was washed with water, and the solvent was removed on a rotary evaporator under reduced pressure 6. The polymer of claim 1 wherein the $R_p$ radicals consist of

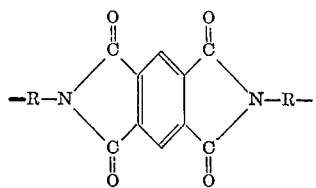

and —$CH_2$—D—$CH_2$— groups in a ratio of about 75:25::25:75.

7. The polymer of claim 6 wherein R is an alkyl radical.

8. The polymer of claim 7 wherein R is —$CH_2CH_2$— and D is the divalent hydrocarbon radical of a dimerized fat acid obtained by polymerizing ethylenically unsaturated monocarboxylic acids of 18 carbon atoms.

References Cited

UNITED STATES PATENTS 3,205,199  9/1965  Preston et al. _____ 260—77.5

SAMUEL H. BLECH, Primary Examiner

U.S. Cl. X.R.

260—47, 49, 325, 635